Dec. 19, 1933.  J. BIJUR  1,939,654
CHASSIS LUBRICATION
Original Filed Nov. 5, 1923   2 Sheets-Sheet 1
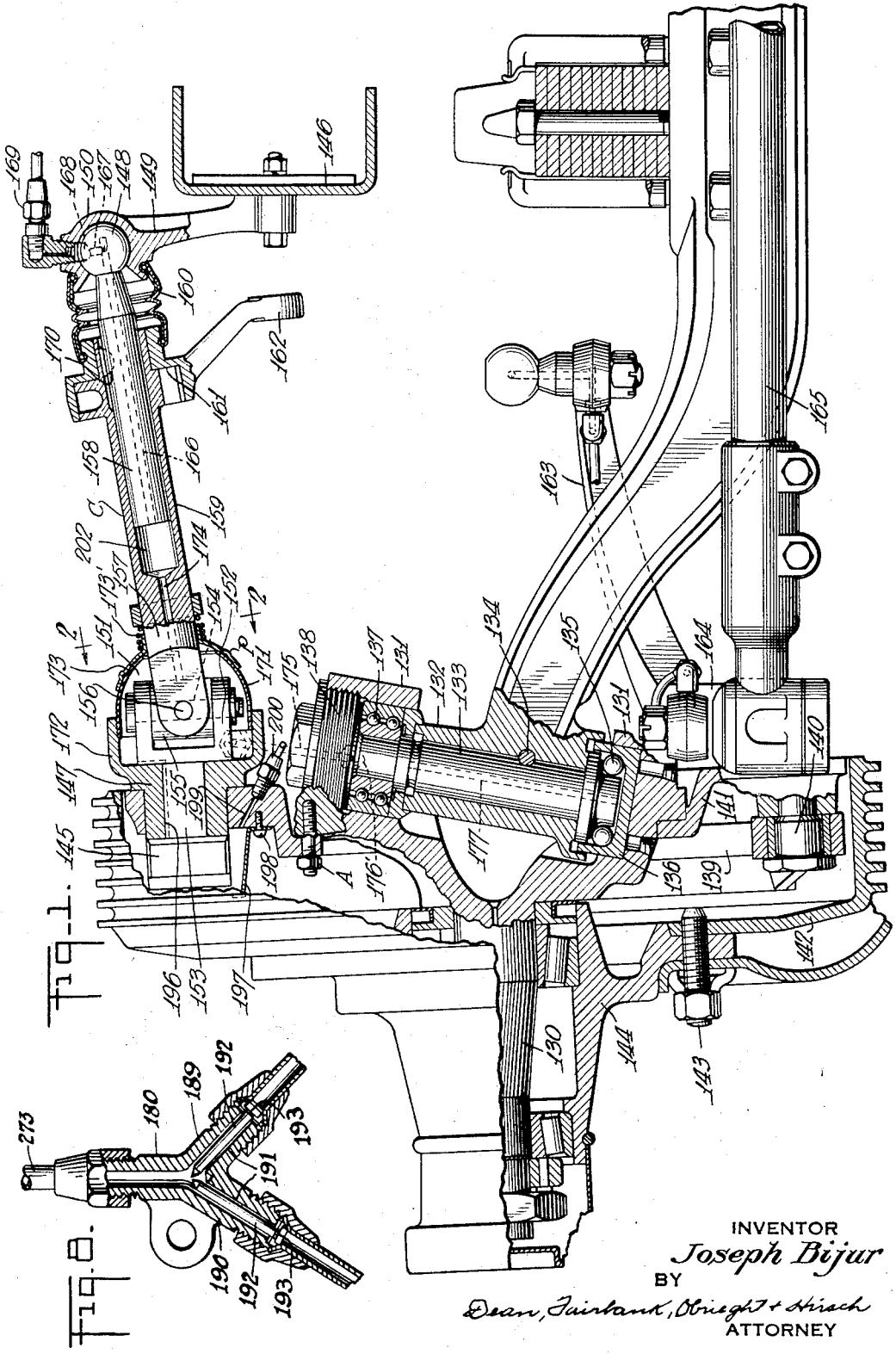
INVENTOR
*Joseph Bijur*
BY
Dean, Fairbank, Obright + Hirsch
ATTORNEY Dec. 19, 1933.  J. BIJUR  1,939,654
CHASSIS LUBRICATION
Original Filed Nov. 5, 1923  2 Sheets-Sheet 2
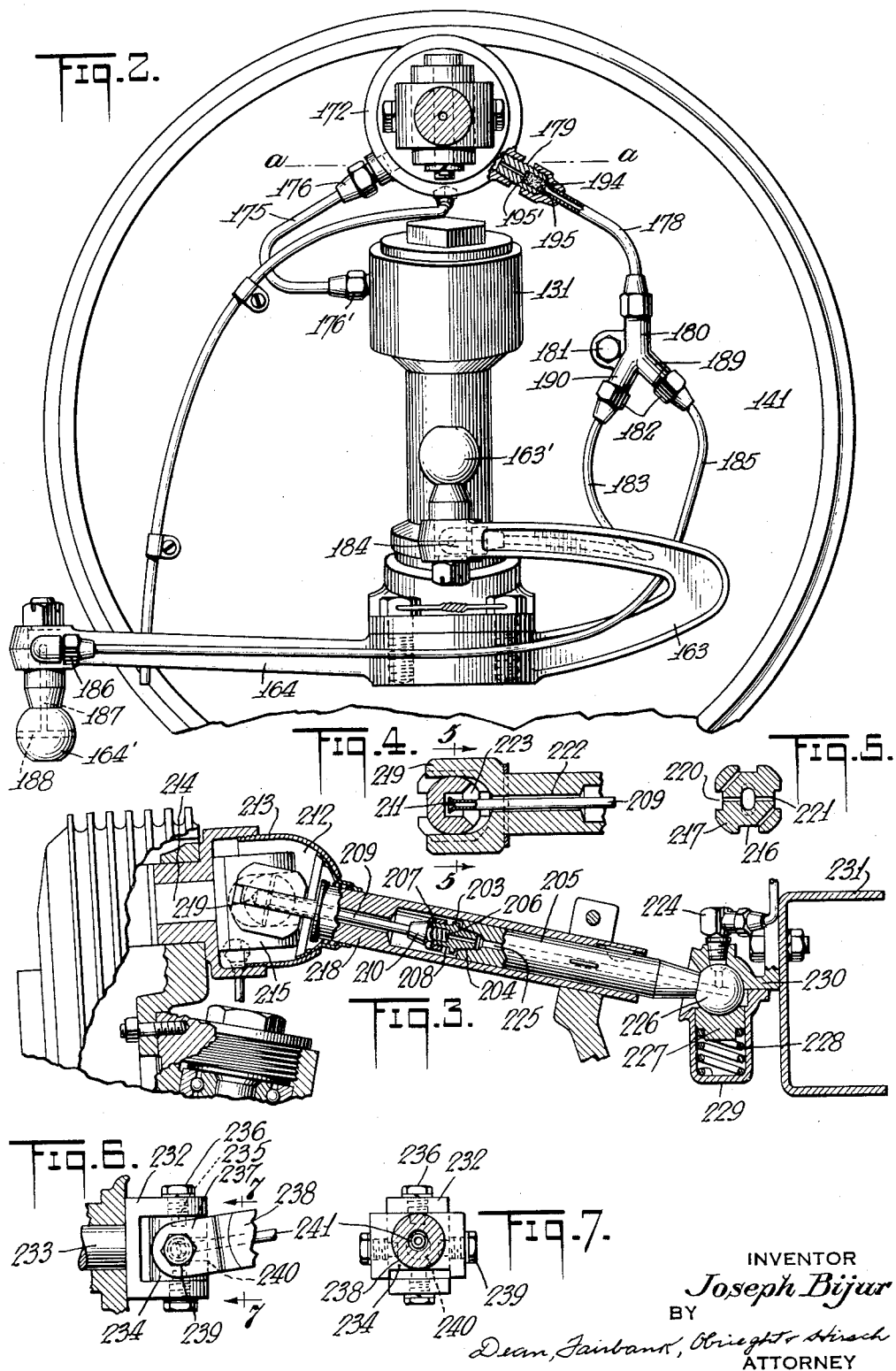
INVENTOR
Joseph Bijur
BY
Dean, Fairbank, Obright & Hirsch
ATTORNEY Patented Dec. 19, 1933

1,939,654

UNITED STATES PATENT OFFICE 1,939,654

CHASSIS LUBRICATION

Joseph Bijur, New York, N. Y., assignor to Auto Research Corporation, a corporation of Delaware Original application November 5, 1923, Serial No. 672,870. Divided and this application June 6, 1928, Serial No. 283,426, and in Great Britain April 30, 1924

23 Claims. (Cl. 184—7)

My present invention relates to chassis lubrication and is more especially concerned with the lubrication of the bearing or wearing surfaces associated with the front wheel knuckle, including some or all of the following: the king pin bearings, the tie rod and drag link bearings, the wear surface of the brake cam and the various bearings or parts of the brake operating shaft.

The invention in a preferred application is concerned with the lubrication of the elements referred to, designated generically the "front wheel control appurtenances" and if desired, also the front wheel spindle, by operation from the chassis, and in one aspect is concerned more especially with the construction and arrangement of conduit means, by which the lubricant is passed to the knuckle.

The knuckle supply conduit, it is apparent, should accommodate the pivotal or steering movement of the knuckle relative to the axle, and its rise and fall relative to the frame, which occurs as the springs flex during travel of the vehicle. My invention has among its objects to provide a serviceable conduit of low cost, which is easy to install on any of a wide variety of vehicles, which provides the required yield or flexibility where yield should occur, which is not subject to whipping, which remains tight even for relatively high lubricant pressure and which is substantially proof against rupture or leak from vibration of the moving vehicle even in hard usage. My invention provides a conduit in the above relation, the parts of which are not likely to be bent or broken off by the usual impacts encountered in ordinary usage, and which, while accommodating the various relative movements without undue strain at any part of the conduit, is, nevertheless, mechanically so strong and is retained in place upon the vehicle structure so securely as not to be torn loose by the driving of the vehicle through brush or bushes, which will suffer no substantial injury from pelting by ice or loose stones that may be thrown up from the road by the movement of the vehicle thereon, which will not be torn off or damaged by mud frozen thereonto, and which will not be disturbed by handling as by removing mud in cleaning the vehicle.

In a preferred embodiment, the lubricant conduit bridges from the chassis frame independently of the axle, transversely across to the knuckle, in a substantially non-sagging line, sufficiently rigid to prevent whipping or flapping, yet with enough yield to accommodate the relative bodily displacement between the knuckle and the chassis in running operation. The conduit outlet and the knuckle inlet form a swiveling joint with respect to each other, which may be a ball and socket universal joint disposed axially of the king pin to permit the swiveling operation of the knuckle for steering and to avoid tension of the transverse or bridging conduit upon the knuckle inlet in the relative bodily displacement between the knuckle and the chassis frame.

In one embodiment universal joints preferably of the ball and socket type are provided both at the inlet or chassis end and at the knuckle pivot end of the bridging conduit, the latter comprising telescoping pipe or rod elements providing a sliding connection to accommodate the displacement of the knuckle relative to the frame in operation.

It is preferred to have a substantial length of conduit rigid with the ball or universal joint or joints, in order to provide considerable leverage, functioning in operation of the vehicle to automatically loosen the joint, should it be stiff from setting up tight or from corrosion, or due to the entry of sand or mud.

In a construction of the type in which the front brake operating shaft extends transversely from the chassis frame to the knuckle above the king pin, I may employ said shaft as the conduit for conveying the lubricant from the chassis frame to the various brake bearings and to the knuckle. For this purpose, the brake operating shaft may be provided with a shell mounted on the knuckle and enclosing the universal joint at the knuckle end of the operating shaft, the shell thus substantially directly above the king pin. Oil delivered through the brake operating shaft is collected in the shell from which the bearings are lubricated by gravity flow through conduits tapping said shell.

The knuckle inlet may be disposed in convenient location immediately above the king pin to supply lubricant by gravity flow to the various bearings, which are at lower level. If any of the bearings or parts to be lubricated as, for instance, the brake operating shaft, is at level higher than the king pin, the knuckle inlet may in one embodiment, be mounted on the knuckle, coaxial with the king pin and at a level well thereabove, so that even the highest of the bearings may receive oil by gravity flow from the inlet.

I do not claim herein, the means per se for dividing the lubricant among the several knuckle bearings, that subject matter being included in a copending application.

In the drawings:

Fig. 1 is a view in longitudinal cross-section, indicating means for lubricating front wheel brake and other wheel or knuckle control bearings, Fig. 2 is a sectional view taken along the line 2—2 of Fig. 1, Fig. 3 is a fragment of a view generally similar to Fig. 1 showing a modification, Fig. 4 is a detail sectional view through one universal of Fig. 3, Fig. 5 is a detail sectional view taken along the line 5—5 of Fig. 4, Fig. 6 is a fragmentary view of a modified form of universal joint for the knuckle end of the lubricant supply conduit, Fig. 7 is a sectional view taken along the line 7—7 of Fig. 6, Fig. 8 is a view on an enlarged scale in longitudinal cross section illustrating the dividing fitting shown in the assembly of Fig. 2.

In Figs. 1 and 2, I have shown a front wheel knuckle which includes a brake. The assembly as a whole is not my invention, apart from the lubricating arrangement therefor. The knuckle unit includes the bearing 130 for the front wheel and has a clevis 131 unitary therewith and straddling the end 132 of the front axle to which it is pivotally connected by the usual king pin 133 which is preferably pinned to the axle as at 134. A ball thrust bearing 135 at the lower end of the king pin rests within a cap 136 rigidly fixed in the lower jaw of the clevis, and supports the weight of the chassis. A ball bearing 137 encircles the king pin at the upper clevis jaw, which is closed by a screw plug 138.

The brake comprises an internal band 139 having two halves hinged at their lower ends to a stud 140 rigidly fixed in the brake shield 141. The brake shield is secured to the knuckle clevis by a plurality of studs as at "A" and the brake drum 142 is bolted at 143 to the wheel hub 144. The brake band is expanded against the brake drum 142 by means of a cam 145 coacting with the upper or free ends of the brake band halves and set and released by operation from the chassis frame. In the particular embodiment shown, the mechanical connection for operating the cam 145 from the chassis frame includes a cam shaft C bridging transversely of the vehicle, and having at the knuckle end a bearing 147 within the brake shield 141. At the opposite or chassis frame end, the cam shaft is provided with a ball 148 lodged in a socket 150, which is upon a special bracket 149 clamped to the channel frame 146 and extending well thereabove. A universal joint 151 is provided substantially coaxial with the king pin, and comprises a clevis 152 rigid with the cam stud shaft 153. The pivot pin 154 through the clevis mounts the hub 155 to which is connected by means of studs 156, the clevis 157 at the outer end of the cam shaft C. To accommodate the limited approach and separation of the ends of the cam shaft relative to each other, in ascent and descent of the axle and knuckle relative to the frame in operation, the cam shaft is formed as shown of two telescoping parts, including a rod 158 integral with the ball 148 and a socket 159 telescoped thereover, integral with universal clevis 157. A flexible boot 160 is connected between bracket 150 and an operating collar 161 near the chassis end of the tube 159. Operation of the brake mechanism on the chassis, effects rotation of collar 161 through arm 162 and thereby turns cam shaft C and with it the universal 151 to operate the cam 145. The universal joints at the ends of the cam shaft and the telescoping relation of the parts thereof, serve to accommodate the various displacements of the knuckle relative to the channel frame. The universal 151 being substantially coaxial with the king pin, the pivotal or steering operation of the knuckle occurs without strain on shaft C. The left-hand knuckle shown, includes a steering arm 163 rigid therewith, coacting with the usual steering gear (not shown) and a tie rod arm 164, by which steering action is transmitted through a tie rod 165 to the right-hand knuckle.

By my present invention, I have provided means now to be described for lubricating from a single source, bearings of the various control appurtenances associated with the knuckle. In this embodiment, the cam shaft itself serves as the conduit for conveying lubricant from the chassis to the knuckle. The cam shaft rod 158 is provided with a longitudinal bore 166 supplied from a radial bore 167 which drains a well 168 in the ball 148 within which the lubricant from the inlet fitting 169, illustratively a drip plug, is collected. The cam shaft rod is preferably keyed as at 170 with respect to the cam shaft socket 159, so as to prevent the free rotary displacement of the rod, the well 168 being thus maintained at all times in position to collect the discharge of the inlet fitting 169.

The universal joint 151 at the knuckle end is provided with a substantially oil-tight enclosing shell 171 comprising a generally spherical casing threaded into a flange 172 on the bearing 147 and provided with a cover 173 encircling the shaft 159 and sliding universally with respect to said shell in the relative displacement of the parts in operation. The cover 173 has packing $p$ to maintain the parts in dust-tight relation under the pressure exerted by coil spring 173' which presses the cover against the shell. The knuckle end of the cam shaft C has a longitudinal bore 174 through which the lubricant from rod 158 passes into the shell 171.

In the embodiment shown, a pipe 175 is connected by a fitting 176 at its upper end into the flange 172 of the universal joint housing at a point above the lowermost part thereof and at its lower end 176' into the upper of the knuckle clevises 131, so as to lubricate ball bearing 137 by gravity flow thereto from the shell 171. The king pin has a bore 177 through which lubricant passes from the ball bearing 137, to collect in cup 136 at the bottom, in order to lubricate the thrust bearing 135.

A second conduit supplies lubricant from the universal joint housing to the tie rod bearing 163' and the steering gear bearing 164'. This conduit comprises a short length of pipe 178 connected by a fitting 179 to the universal joint housing flange 172 above the bottom thereof at the side opposite pipe 175 and delivering to a dividing or Y fitting 180 which is secured at a lug 181 to the brake shield 141. The respective arms 189 and 190 of the Y fitting are connected as by union nuts 182 to a metal pipe 183 connected by fitting 184 to the tie rod bearing 163' and a second metal pipe 185 connected by fitting 186 to the tie rod arm bearing 164'. The lubricant passes to the bearing surface of each bearing stud 163'—164' through a longitudinal duct 187 communicating with radial duct 188.

To assure proper division of the lubricant flowing by gravity from the universal housing shell 171 to the steering arm and tie rod bearings, the dividing fitting may be constructed as best shown in Fig. 8. The dividing outlets 189 and 190 have enlarged bores 191, within which are fitted pins 192 maintained in place therein by perforated friction-fitted caps 193. The pins are of diameter several thousandths of an inch smaller than the corresponding bores, so that the lubricant will be sufficiently dammed in its gravity flow to the bearings to divide substantially equally.

To divide the flow accurately between pipe 175 and pipe 178, damming plugs 194, illustratively of felt, are provided in fittings 176 and 179. Each of the damming plugs is maintained within its fitting by a perforated metal friction cap 195 and is backed by a metal screen 195'. The felt damming plugs also serve to intercept any solid particles carried with the oil.

An oil groove 196 extends longitudinally from the universal joint housing 172 along the entire length of bearing 153 to supply lubricant to it as well as to the wear surface of the cam 145. A metal trough 197 is preferably secured as at 198 to the inner surface of the brake shield, to intercept any excess lubricant dripping from the cam, so that the efficacy of the brake bands will not be impaired by any eventual dripping of oil thereonto. The trough 197 is drained through a duct 199 which extends obliquely through the brake shield and delivers to an outlet fitting 200 which, in turn, may drip either upon the road or, if desired, may be connected in any convenient manner (not shown) to supply the steering arm and tie rod, or the king pin bearings.

In operation, lubricant passed from the channel frame flows by gravity through the cam shaft and collects at the bottom of the shell 171. The excess above the level indicated by line $a$—$a$ in Fig. 2 drains in parallel by gravity flow through duct 175 to lubricate the king pin bearings and through duct 178 to lubricate the steering arm and tie rod bearings in the manner apparent from the previous description.

It will be observed that the ends of conduit 175 and of dividing conduit 178—183—185 constitute, in effect, rigid parts of the knuckle, moving as a unit therewith, so that the conduits require no flexibility and can, therefore, be and preferably are of seamless metal pipe which is not subject to leaks nor to rapid destruction or to flapping or whipping in operation. The entire length of the piping preferably extends as shown, along structural parts of the kunckle, that is, as best shown in Fig. 2 along the brake shield and along the lengths of the steering and tie rod arms.

The lubricant which is ordinarily at least at the level $a$—$a$ in the universal joint housing, splashes freely therein as a result of the vibration in operation of the vehicle, thereby maintaining the universal joint pins 154 and 156 lubricated, while some of the splashed lubricant passes to groove 196 to lubricate bearing 153 and escapes therebeyond to oil the wear surface of the cam 145, any excess from the latter being intercepted by trough 197 and drained in the manner previously described. The lubricant from the chassis, it will be seen, not only lubricates the ball 148, but some portion thereof will be intercepted in the cavity 202 between the inner end of the cam shaft rod 158 and the base of the socket 159 therefor, for effective lubrication of the sliding joint between the two cam shaft elements.

Thus, it will be seen, that the lubricant after it has been forced from the drip plug 169, flows from the highest point in the knuckle system at the ball 148 by gravity to the shell 171, which constitutes the knuckle inlet and is a junction fitting or lubricant distributer, at which the lubricant is divided and from which it continues by gravity flow in parallel to the king pin, steering arm and tie rod bearings, the universal joint pins being lubricated by the splash, part of which drains to the bearing and wear surface of the brake. The length of the brake operating shaft including the shell 160, and the shell 171 constitutes a tight housing which prevents the entry of dust thereto, to the oil duct or to the bearings.

In Fig. 3 is shown a fragment of a modified form of the invention, particularly applicable in constructions generally of the type last described, in which the cam shaft slopes upward from the chassis frame to the knuckle as shown, rather than downward. The ball 226 at the inlet end of the cam shaft is sustained in this embodiment upon a ball cap 227 pressed by spring 228 within cap 229 against a complementary ball bracket 230 bolted directly to channel 231. The lubricant conduit through the cam shaft in this embodiment is modified with respect to that shown in Figs. 1 and 2, primarily in the provision of a check valve somewhere along the length of the cam shaft to prevent gravity return to the channel frame of lubricant that might be in the pipe. For this purpose, a special check valve fitting 203 is threaded as at 204 into the innermost end of the cam shaft rod 205, said fitting having a valve chamber 207 containing a valve (not shown) closed by pressure of coil spring 206. The outlet pipe 209 from valve 206 is secured thereto by an appropria'e union fitting 210 threaded onto the nipple 208 and delivers as at 211 to the universal joint 212 which is encased within housing 213 in the same manner as in Figs. 1 and 2 previously described.

In the present embodiment, the universal joint is illustratively shown of construction differing from that of Figs. 1 and 2. The cam stud shaft 214 is provided with integral arms 215 fitting into a corresponding groove 216 in an approximately globular trunnion block 217, the cam shaft 218 having a similar pair of jaws 219 extending in a plane at right angles to jaws 215 and similarly fitting in'o corresponding grooves 220 in the trunnion block. The trunnion block has transverse oil ducts 221 therethrough, to pass the lubricant to the bearings thereof with respect to the clevis jaws. The pipe 209 is preferably supported only at the valve fitting end thereof and extends substantially freely with small clearance through a corresponding bore 222 at the knuckle end of the cam shaft and protrudes freely into a corresponding cavity 223 in the trunnion block 217, formed sufficiently wide to accommodate the displacement of said block in operation. It will be seen that as lubricant escapes past the drip plug 224, it is forced upward through duct 225 in rod 205, since it cannot readily escape through the relatively tight joint of the ball 226 in its socket. The pressure transmitted through the incompressible column of lubricant in the upward extending duct 225 overcomes the resistance of spring 206 to open the valve and is thence continued upward through pipe 209 to lubricate the universal joint 212, the excess passing from the cavity 223 to the bottom of the universal joint housing, whence it is delivered to the various knuckle bearings in the manner shown in Figs. 1 and 2 and previously described. In this embodiment, I have not shown the lubrication of the cam stud shaft or of the cam, it being understood, of course, that this may be here provided in the same manner as in Figs. 1 and 2. If desired, the lubricant for the knuckle bearings may, in this embodiment, be tapped from the very bottom of the universal joint housing, since the universal joint is lubricated directly through the inlet conduit 209, as already described. It may be preferred, however, to tap the lubricant for the king pin, tie rod and steering arm bearings, in the manner shown in Fig. 2, in which case, of course, the universal joint would also receive splash lubrication.

In Figs. 6 and 7 is shown an alternative embodiment of universal joint for the knuckle end of the brake operating rock-shaft. In this embodiment, the clevis 232 rigid with the cam shaft stub 233 straddles a universal hub 234, which is mounted therein by the pivot ends 235 of screws 236 through said clevis. The clevis end 237 of the cam shaft 238 is similarly connected to the universal hub by the pivot ends of a pair of screws 239 through the latter clevis. The universal hub has a bore 240 therein providing sufficient clearance for the oil inlet pipe 241 to accommodate the relative movement of the hub in operation of the universal. The various types of universal joints described can, of course, be interchangeably used whether the brake operating shaft slopes downward from the chassis as in Figs. 1 and 2, or upward as in Fig. 3.

As many changes could be made in the above construction, and many apparently widely different embodiments of this invention could be devised without departing from the scope thereof, it is intended that all matter contained in the above description or shown in the accompanying drawings shall be interpreted as illustrative and not in a limiting sense.

I claim:

1. In a motor vehicle of the type comprising a front axle, a front wheel knuckle having a bearing in the end of the axle, a plurality of control appurtenances carried by said knuckle and having bearings; the combination therewith of a lubricant conduit bridging between the chassis frame and the pivot axis of the knuckle and having a universal joint at the latter end thereof, and being distendable and contractible, an enclosure for said universal joint rigid with said knuckle and outlet pipes supplied from said enclosure and leading to said bearings.

2. In a motor vehicle of the type comprising a front axle, a front wheel knuckle having a bearing in the end of the axle, a plurality of control appurtenances carried by said knuckle and having bearings; the combination therewith of a lubricant conduit bridging between the chassis frame and the pivot axis of the knuckle, universal joint sustaining means at opposite ends of said conduit, said conduit self-sustaining between said universal joints, an enclosure housing the universal joint element at the knuckle end of the conduit, said enclosure rigid with the knuckle, and outlet pipes from said enclosure extending along parts of the knuckle to supply said bearings.

3. In a motor vehicle of the type comprising a front axle, a front wheel knuckle, a plurality of control appurtenances carried by said knuckle and having bearings; the combination therewith of a lubricant conduit bridging between the chassis frame and the knuckle, and comprising an inlet tube having a universal support on the chassis frame, a delivery tube telescoped over said inlet tube and having a support on a part rigid with said knuckle, a universal joint between said tube and said support and substantially along the line of the knuckle pivot axis and above the knuckle bearing, a collecting means for receiving lubricant from said universal, and conduit means draining to said bearings, the lubricant collected from said universal.

4. In a motor vehicle of the type comprising a front axle, a front wheel knuckle having a bearing in the end of the axle, a plurality of control appurtenances carried by said knuckle and having bearings; the combination therewith of a lubricant conduit bridging between the chassis frame and the knuckle and having a universal joint at the latter end, an enclosure for said universal joint collecting oil from said conduit for splash lubrication of said joint, and outlet pipes tapping said enclosure at a level above the bottom thereof and leading to said bearings.

5. Means for lubricating the control bearings on the knuckle of a motor vehicle from a source on the chassis comprising an inflexible lubricant conduit extending transversely of the vehicle from the chassis frame to substantially the pivot axis of said knuckle, and self-sustaining between its ends in a substantially non-sagging line and having a part thereof axially displaceable to accommodate the displacement of the knuckle relative to the frame in operation, means for forcing lubricant from the chassis frame into said conduit for delivery to the knuckle, and a check valve in said conduit for preventing escape or loss of lubricant therefrom between operations.

6. In a vehicle construction of the type including a front wheel knuckle, a brake thereon, an operating shaft therefor extending transversely from the chassis and having bearings at both ends in which it is rocked in actuation, and constructed and arranged to telescopically accommodate the displacement of the knuckle relative to the frame in vertical and horizontal planes and in the steering action; the combination therewith of a lubricant inlet to said operating shaft at the frame end thereof, a lubricant duct extending through the length of said shaft and communicating with the bearings thereof, a collector at the knuckle end of said shaft to receive lubricant from the bearing thereat and a distributing system upon said knuckle receiving lubricant therefrom.

7. In a front wheel construction of the type including a front wheel knuckle having a brake shield, a brake operated from a shaft extending transversely from the chassis through said shield and having bearings at both ends in which it is rocked in operation, and constructed and arranged to accommodate the displacement of the knuckle relative to the frame in vertical and horizontal planes and in the steering action; the combination therewith of a lubricant inlet member at the chassis frame end of said conduit from which the lubricant passes by gravity flow to the successive bearings along the length of the shaft, a collector at the knuckle end of said shaft to receive lubricant from the bearing thereat and a distributing system upon said knuckle receiving lubricant therefrom.

8. In a motor vehicle, in combination, a front wheel knuckle having a king pin pivot axis, a brake shield carried by said knuckle, brake cam operating means having a bearing mount in said shield and above said king pin and having a universal joint substantially at said pivot axis, a lubricant inlet supplying said universal joint, a lubricant distributor rigidly mounted upon said knuckle enclosing said universal joint, said distributor being so constructed and arranged as to receive lubricant drainage from said universal joint and supply it by splash to said brake cam bearing mount.

9. In a vehicle, in combination, a wheel having a brake drum, a brake band co-operating therewith, a cam for operating said brake band from a control on the chassis adjacent the top of said drum, means for supplying lubricating oil to the wear surface of said cam, a trough for intercepting excess lubricant from said cam and an outlet duct for draining said excess to prevent drip of lubricant onto the brake surface.

10. A front wheel construction of the type including a knuckle, a brake, an actuating shaft therefor which extends transversely from the chassis through a brake shield on said knuckle and has a ball and socket bearing at the chassis end, and a universal joint substantially in axial alignment with the pivot axis of the knuckle, and which includes telescoping parts between said universal joints; the combination therewith of means for conveying lubricant from the chassis frame to the various bearings of said brake shaft and to other bearings carried by the knuckle, said means including a lubricant inlet at the chassis frame, longitudinal lubricant ducts supplied therefrom and through the telescoping elements of said actuating shaft, means for leading lubricant from the knuckle end of said actuating shaft to said other bearings, a flexible boot connecting the chassis end of the actuating shaft to the socket member of the contiguous ball and socket joint, and a dust-tight shell enclosing the universal joint at the knuckle end, whereby the lubricant will be passed to the various bearings at the knuckle through the brake actuating shaft without entry of dust thereto.

11. Means for lubricating the mechanism employed in vehicle front wheel brake controls, comprising a hollow brake control shaft having one end universally supported on a non-rotating part of the vehicle, and means for passing lubricant to and through said hollow control shaft for the purposes described, including a tubing enclosed therewithin.

12. In a front wheel construction of the type including a knuckle, a brake operated from a cam shaft extending transversely and sloping upward from the chassis and having bearings at its ends at the chassis and at the knuckle, in which bearings it is rocked in operation, and constructed and arranged to accommodate the displacement of the knuckle relative to the frame in vertical and horizontal planes and in the steering action; the combination therewith of an inlet to said cam shaft at the chassis frame end thereof for forcing the lubricant upward through said cam shaft to lubricate the bearings thereof in succession, and a check valve in said conduit to prevent the escape of lubricant therefrom between lubricating operations.

13. In a front wheel construction of the type including a knuckle, a brake operated from a cam shaft which extends transversely from the frame through a brake shield on said knuckle and having bearings at both ends in which it is rocked in operation, said cam shaft having universal joints respectively at the chassis and at the pivot axis of said knuckle and including telescoping parts between said universal joints, all to accommodate the displacement of the knuckle relative to the frame in running and steering operations; the combination therewith of a conduit through the cam shaft, an inlet fitting for supplying lubricant at the chassis end thereof, a check valve fitted into the free end of the inner of said telescoped shaft elements, and a conduit through the outer of said shaft elements to the universal joint on the knuckle.

14. In a motor vehicle, in combination, a front wheel knuckle, a front wheel brake carried thereby, an actuating shaft for said brake bridging from the chassis frame to said knuckle, said shaft constituting also a conduit for lubricant to be conveyed to the knuckle, said shaft including a rod element having a ball at the chassis end, a socket on the chassis coacting with the ball, spring means pressing said socket against said ball, a lubricant inlet through said socket, delivering to said ball, and a longitudinal passage from said ball through said shaft for conveying the lubricant therethrough.

15. In a vehicle, in combination, a wheel having a brake drum, a movable brake means co-operating therewith adjacent the top of the drum, a cam for operating said brake means from a control on the chassis, means for supplying lubricating oil to the wear surface of said cam, a trough for intercepting excess lubricant from said cam and an outlet duct for draining said excess to prevent drip of lubricant onto the brake surface.

16. In a lubricating installation for a motion transmitting mechanism including two shafts with a universal connection, said shafts extending respectively from said connection to relatively fixed and movable elements, a conduit through one shaft into said universal connection, a lubricant receiver encircling said joint and receiving drainage therefrom so positioned as to lubricate said connection by splash and means for draining said receiver receiving lubricant at a substantial elevation above the bottom thereof so as to maintain a lubricant pool therewithin.

17. A knuckle lubrication installation for the king pin and steering control bearings associated therewith comprising a lubricant distributor upon the knuckle structure positioned substantially above and removed from the upper end of the king pin, and individual conduit systems extending downwardly from said distributor to said bearings.

18. A knuckle lubrication installation for the king pin and steering control bearings associated therewith comprising a lubricant distributor upon the knuckle structure positioned substantially above and removed from the upper end of the king pin, and individual conduit systems extending downwardly from said distributor to said bearings, dividing means being associated with said conduit systems to proportion the lubricant therebetween.

19. A knuckle lubrication installation for the king pin and steering control bearings associated therewith comprising a lubricant distributor upon the knuckle structure positioned substantially above and removed from the upper end of the king pin, and individual conduit systems extending downwardly from said distributor to said bearings, felt plug restrictions being associated with said conduit systems to proportion the lubricant therebetween.

20. A knuckle lubrication installation for the king pin and steering control bearings associated therewith comprising a lubricant distributor upon the knuckle structure positioned substantially above and removed from the upper end of the king pin, and individual conduit systems extending downwardly from said distributor to said bearings, both the tie rod and steering arm bearings being lubricated and the conduit system leading thereto being provided with a dividing pin-restricted fitting to proportion the lubricant therebetween.

21. A knuckle lubrication installation for the king pin and steering control bearings associated therewith comprising a lubricant distributor upon the knuckle structure positioned substantially above and removed from the upper end of the king pin, and individual conduit systems extending downwardly from said distributor to said bearings, one of said conduit systems leading to the king pin bearings in series and the other to the steering bearings in parallel, and dividing means being associated with said systems to proportion the lubricant between the two systems and between the steering bearings.

22. A knuckle lubrication installation for the king pin and steering control bearings associated therewith comprising a lubricant distributor upon the knuckle structure positioned substantially above and removed from the upper end of the king pin, and individual conduit systems extending downwardly from said distributor to said bearings, said conduit systems being connected in parallel one passing downwardly through the king pin to lubricate the bearings thereof and the other extending around the king pin on the outside of the knuckle to said steering bearings.

23. A knuckle lubrication installation for the king pin and steering control bearings associated therewith comprising a lubricant distributor upon the knuckle structure positioned substantially above and removed from the upper end of the king pin, and individual conduit systems extending downwardly from said distributor to said bearings, said conduit systems being connected in parallel one passing downwardly through the king pin to lubricate the bearings thereof and the other extending around said king pin to said steering bearings, and means being provided at the place of connection of said systems to the distributor to proportion lubricant therebetween.

JOSEPH BIJUR.